(12) United States Patent
Krammer

(10) Patent No.: US 10,787,119 B2
(45) Date of Patent: Sep. 29, 2020

(54) METHOD FOR GENERATING DRIVING NOISES, ACOUSTICS CONTROLLER AND MOTOR VEHICLE

(71) Applicant: Audi AG, Ingolstadt (DE)

(72) Inventor: Johann Krammer, Ingolstadt (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/615,016

(22) PCT Filed: May 29, 2018

(86) PCT No.: PCT/EP2018/063972
§ 371 (c)(1),
(2) Date: Nov. 19, 2019

(87) PCT Pub. No.: WO2018/219885
PCT Pub. Date: Dec. 6, 2018

(65) Prior Publication Data
US 2020/0198536 A1    Jun. 25, 2020

(30) Foreign Application Priority Data
Jun. 1, 2017 (DE) .......... 10 2017 209 280

(51) Int. Cl.
*B60Q 5/00* (2006.01)
*G10K 15/02* (2006.01)

(52) U.S. Cl.
CPC ............ *B60Q 5/008* (2013.01); *G10K 15/02* (2013.01)

(58) Field of Classification Search
None
See application file for complete search history.

(56) References Cited

U.S. PATENT DOCUMENTS 3,753,064 A * 8/1973 Agarwal .................. 318/803
7,979,147 B1 * 7/2011 Dunn .................. G10K 15/02
181/192

(Continued)

FOREIGN PATENT DOCUMENTS

CA    1114954 A    12/1981
CN    201961232 U    9/2011

(Continued)

OTHER PUBLICATIONS

English machine translation of DE 102010049359 A1 (Year: 2011).*

(Continued)

*Primary Examiner* — James K Mooney
(74) *Attorney, Agent, or Firm* — Sterne, Kessler, Goldstein & Fox P.L.L.C.

(57) ABSTRACT

The present disclosure relates to a method for operating an electric motor, wherein a vehicle dynamics controller transmits a driving-performance-related torque setpoint to an acoustic controller configured as a control device. The acoustic controller receives an input value for defining an acoustic signal as well as a phase angle of a rotor of the electric motor from the power electronics as well. To generate a dynamic torque setpoint, the acoustic controller modulates onto the driving-performance-related torque setpoint at least one torque pattern that depends on the phase angle of the rotor of the electric motor, wherein the dynamic torque setpoint is such that a sound according to the input value is generated by the electric motor and/or a drive train. The dynamic torque setpoint is transmitted to power electronics.

10 Claims, 2 Drawing Sheets

Motor Vehicle (MV) Method

(56) References Cited

U.S. PATENT DOCUMENTS

| | | | |
|---|---|---|---|
| 9,762,162 B2* | 9/2017 | Strasser | B60L 50/50 |
| 2010/0134058 A1 | 6/2010 | Nagashima et al. | |
| 2016/0144782 A1* | 5/2016 | Jo | H04R 3/00 |
| | | | 381/86 |
| 2017/0096099 A1 | 4/2017 | Matsubara et al. | |
| 2017/0217331 A1* | 8/2017 | Valeri | B60L 50/51 |

FOREIGN PATENT DOCUMENTS

| | | |
|---|---|---|
| CN | 201980143 U | 9/2011 |
| CN | 102862513 A | 1/2013 |
| CN | 105383410 A | 3/2016 |
| DE | 2928896 C2 | 2/1980 |
| DE | 102008040139 A1 | 2/2010 |
| DE | 102009046166 A1 | 7/2010 |
| DE | 102010049359 A1 | 5/2011 |
| DE | 102010043973 A1 | 5/2012 |
| DE | 102011000175 A1 | 7/2012 |
| DE | 102011056688 A1 | 6/2013 |
| DE | 102014219769 A1 | 3/2016 |
| DE | 102015208211 A1 | 11/2016 |
| JP | 2017071240 A | 4/2017 |

OTHER PUBLICATIONS

International Search Report and Written Opinion of the International Searching Authority directed to related International Patent Application No. PCT/EP2018/063972, with certified English-language transation of Written Opinion, dated Aug. 16, 2018; 18 pages.

International Preliminary Report on Patentability directed to related International Patent Application No. PCT/EP2018/063972, dated Dec. 12, 2019, with attached English-language translation; 15 pages.

Chinese Application No. 201880036324.7, Office Action dated Apr. 27, 2020; English Translation from EPO Global Dossier, 7 pages.

* cited by examiner

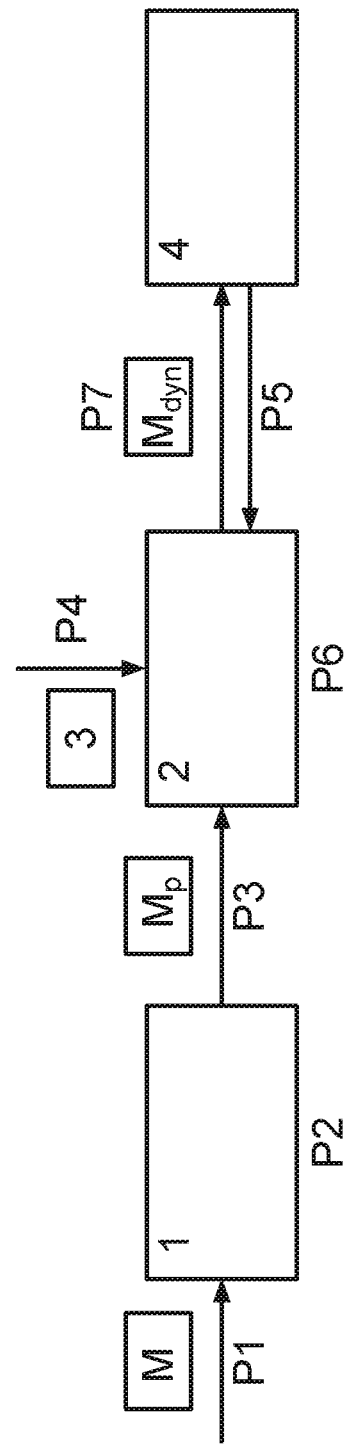

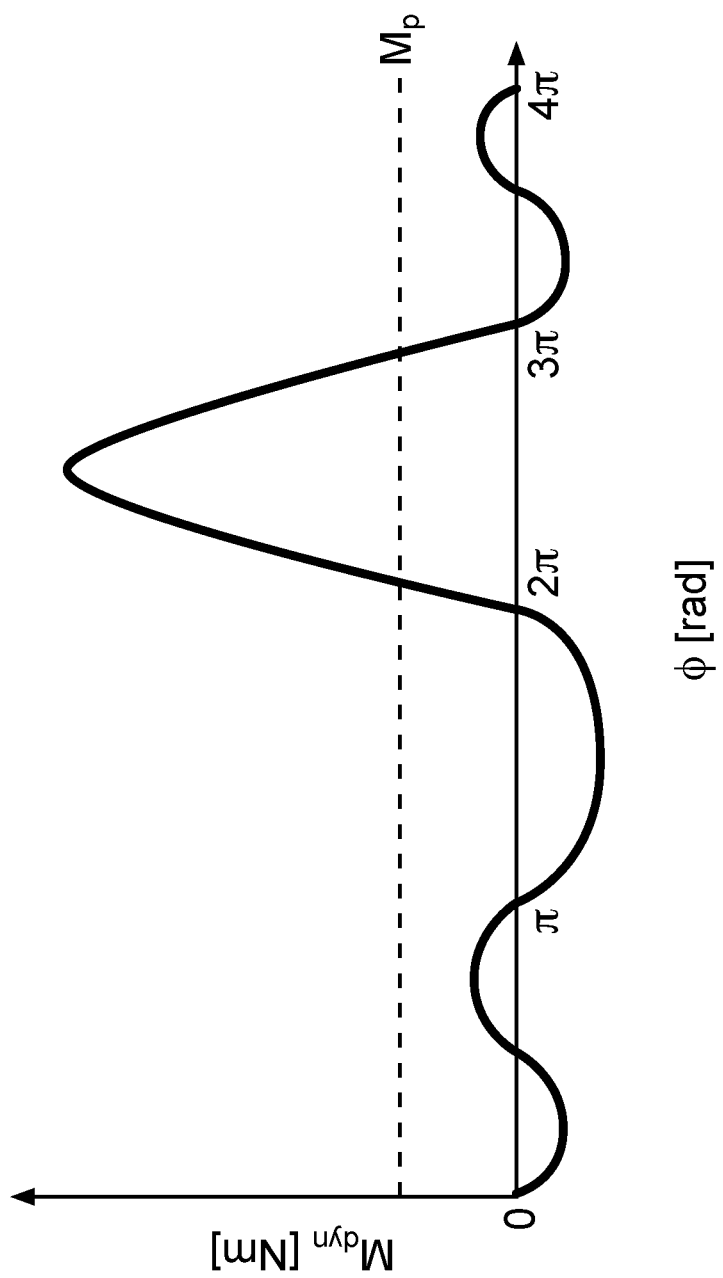

METHOD FOR GENERATING DRIVING NOISES, ACOUSTICS CONTROLLER AND MOTOR VEHICLE

TECHNICAL FIELD

The present disclosure relates to a method for generating driving sounds, an acoustic controller and a motor vehicle.

BACKGROUND

Electric motor vehicles are quiet compared to motor vehicles with a combustion engine. Consequently, they are hard to notice by other traffic participants, which may pose a traffic risk. To make electric motor vehicles easier to notice and to thereby increase the safety of traffic participants the National Highway Traffic Safety Administration (NHTSA) required introduced a new regulation will come into effect in September 2019. The new regulation states that four-wheel motor vehicles of less than 4.5 ton weight must be equipped with a sound-emitting device to compensate for the lack of motor sounds. This device is a loudspeaker, which emits a driving sound on a continuous basis.

The installation of a respective loudspeaker in a motor vehicle is, however, associated with technical effort and results in higher production costs. For this reason, methods or devices are being developed that allow for the generation of sound without the need for a loudspeaker. One group of these methods is based on a modulation of high-frequency electrical signals, which cause electric motors to imitate sound on the basis of the physical effect of magnetostriction. What is disadvantageous about this method is, however, that the requirements pertaining to the electromagnetic tolerance of such systems cannot be met or can only be met with a high degree of effort. In addition, humans perceive the high sounds generated by the electric motors as unpleasant.

Prior art, i.e., DE 10 2011 056 688 A1, also discloses a motor vehicle, in particular a hybrid or electric vehicle with an electric motor and a signal generation device. The signal generation device generates an acoustic signal on the basis of an operating state of the electric motor. This may mean that a body element is caused to vibrate.

DE 10 2008 040 139 A1 describes an assembly for the generation of a simulated operating sound of a drive unit of a vehicle. It provides that the operating sound is generated or influenced by a sound generator regardless of the actual engine speed and/or the actual load of the drive unit.

DE 10 2011 000 175 A1 describes a motor vehicle with an electric drive device, which comprises a simulation device. In a preferred embodiment, the simulation device comprises a vibration generator, which generates vibrations to either haptically or auditively simulate a combustion engine.

BRIEF DESCRIPTION OF DRAWINGS/FIGURES

FIG. 1 illustrates a configuration of a method, in accordance with some embodiments.

FIG. 2 illustrates a diagram with a dynamic torque setpoint applied against the phase angle $\Phi$ of the rotor, in accordance with some embodiments.

DETAILED DESCRIPTION

The object of the present disclosure is to offer a solution that makes the emittance of an acoustic signal by means of an electric motor possible, which is similar to that of a combustion engine.

The present disclosure provides a method for operating an electric motor. This method is characterized by the fact that a driving-performance-related torque setpoint is transmitted from a vehicle dynamics controller to an acoustic controller configured as a control device. The driving-performance-related torque provides the drive torque as specified by the driver or an autopilot. An input value for defining an acoustic signal is transmitted from a control unit to the acoustic controller. A phase angle of a rotor of an electric motor is transmitted to the acoustic controller via power electronics. The torque setpoint is a time signal. To generate a dynamic torque setpoint, the acoustic controller modulates onto the torque setpoint at least one torque pattern which depends on the phase angle of the rotor of the electric motor. The dynamic torque setpoint is configured such that a sound according to the input value is generated by the electric motor and/or a drive train according to the input value. In a last step, the dynamic torque setpoint is transmitted to power electronics. The power electronics may then control or operate the electric motor.

In some embodiments, by way of non-limiting example, a driving-performance-related torque setpoint of this type is varied by an acoustic controller so that a dynamic torque setpoint that depends on the phase angle of the motor corresponds to the torque pattern of a combustion engine. The dynamic torque setpoint is configured such that an electric motor and/or a drive train controlled by power electronics generates a driving sound according to the input value. Consequently, the electric motor does not only provide a torque according to the driving-performance-related torque setpoint, but also a torque which, depending on the phase angle of the rotor of the electric motor, may have a value that deviates from the driving-performance-related torque setpoint. These cyclical fluctuations of the torque cause the electric motor and/or the drive train to emit sound. The modulation is such that the electric motor and/or the drive train emit a driving sound that meets the requirements of the input value.

In some embodiments, a dynamic torque setpoint may, for example, be transmitted to the power electronics in the context of the method, which corresponds to the torque pattern of a diesel engine, wherein the input value reproduces the acoustics of a diesel engine at a same operating state of the motor vehicle. It is, for example, possible to generate a driving sound by means of the electric motor that corresponds to that of a diesel engine at an identical speed of the motor vehicle.

Accordingly, the sound is generated by an electric motor and/or a drive train, which makes the driving sound that is more authentic.

In some embodiments, the method provides that the dynamic torque setpoint within at least one angle range of a specified period of the phase angle has a value that is smaller than the driving-performance-related torque setpoint and has a value within at least one further angle range of the specified period that is greater than the driving-performance-related torque setpoint. By way of non-limiting example, a specified period of the phase angle has at least two angle ranges, wherein the dynamic torque setpoint lies below the value of the driving-performance-related torque setpoint in at least one angle range and above the driving-performance-related torque setpoint in at least one angle range.

The dynamic torque setpoint may lie between 0 and $\pi$ (pi) above the driving-performance-related torque setpoint and in a range from $\pi$ to $2\pi$ below the driving-performance-related torque.

This imitates a torque pattern of a crankshaft of a motor vehicle driven by a combustion motor.

In some embodiments, the static torque setpoint is an average of the dynamic torque setpoint across a period. By way of non-limiting example, the amplitude of the torque progresses across a period of time so that an average of the torque corresponds to the value of the required torque.

Accordingly, a static torque is provided in spite of the modulation of the signal during a period.

In some embodiments, a period comprises at least two superimposed torque patterns, which are offset from each other by a phase offset $\Delta\Phi$ of the phase angle. By way of non-limiting example, the dynamic torque setpoint comprises at least two torque patterns offset by a phase offset $\Delta\Phi$.

The dynamic torque offset may thus be the result of a superimposition of a plurality of torque patterns of a four-stroke cylinder.

This imitates a torque pattern of a multiple cylinder combustion engine and/or its acoustics.

In some embodiments, the period is multiplied by a factor that depends on the input value. By way of non-limiting example, the period is compressed or stretched by a factor that depends on the input value.

In some embodiments, the input value is an operating parameter of the motor vehicle or an audio file. By way of non-limiting example, the input value is an operating parameter of the motor vehicle such as a vehicle speed or engine speed, which is associated with a certain driving sound, or an audio file. The audio file may define a sound to be generated. Accordingly, a specific sound can be generated.

In some embodiments, an acoustic controller is disclosed. The acoustic controller comprises a processor device, which is configured to perform an embodiment of the method as described herein. The processor device may comprise at least one microprocessor and/or at least one microcontroller. The processor device may also comprise program code, which is configured to perform the embodiment of the method as described herein during the operation of the processor device.

In some embodiments, a motor vehicle with an acoustic controller for the performance of one of the methods is disclosed.

The acoustic controller and the motor vehicle have the features that are similar to embodiments described herein in connection with the method. For this reason, embodiments of the acoustic controller and the motor vehicle are not described here again.

Embodiments of the present disclosure are described below with reference to drawings.

Elements having the same functions are provided with the same reference signs in the figures.

FIG. 1 illustrates a configuration of a method, in accordance with some embodiments. FIG. 1 shows a potential course of the method. A requested drive torque M may be transmitted to a vehicle dynamics controller 1 in a first step P1. The drive torque M may be requested, for example, from the control unit of an autopilot or from a driver by operating a gas pedal of the motor vehicle (MV). A vehicle dynamics controller 1 may be a control unit, which may comprise a microcontroller or a microprocessor, which adapts a torque M requested by a driver such that optimized driving dynamics of the motor vehicle (MV) are made possible, for example, such that, in particular, the slip of the wheels is minimized.

This way, a driving-performance-related torque setpoint $M_p$ can be generated in a step P2. The driving-performance-related torque setpoint $M_p$ may be transmitted to an acoustic controller 2 in a step P3. In a step P4, the acoustic controller 2 may also receive an input value 3 and, in a step P5, a phase angle $\Phi$ of a rotor of an electric motor. The input value may be an operating parameter of the motor vehicle (MV) such as a vehicle speed or engine speed, which is associated with a certain driving sound, or an audio file. The acoustic controller 2 may be a control unit, which may comprise a microcontroller or a microprocessor. In a step P6, the acoustic controller 2 may modulate the driving-performance-related torque setpoint $M_p$ in such a way that it may comprise a torque pattern of a combustion engine and transmit the same to power electronics 4 in a step P7.

Accordingly, a dynamic torque setpoint $M_{dyn}$ may depend on the phase angle $\Phi$ of the rotor. It may be possible, for example, that the dynamic torque setpoint $M_{dyn}$ within at least one angle range of specified period of the phase angle $\Phi$ may have a value which is smaller than the driving-performance-related torque setpoint $M_p$ and at least an angle range of the phase angle $\Phi$ with a dynamic torque setpoint $M_{dyn}$ which is greater than the driving-performance-related torque setpoint $M_p$. It may be possible that an average torque of the period is identical with the driving-performance-related torque setpoint $M_p$. A specified period may be, for example, a multiple k of a complete rotation of the rotor, i.e., k 2 $\pi$. This factor may also change depending on the input value 3. The factor k may, for example, assume a different value at a certain speed to thus imitate the shifting of a gear. The period may also be adapted to a resonance frequency of the drive train. The progression of the dynamic torque setpoint $M_{dyn}$ may be comprised of at least two superimposed torque patterns, which can be offset from each other by a phase angle $\Delta\Phi$. Consequently, for example a dynamic torque setpoint $M_{dyn}$ of a multi-cylinder motor may be imitated. The modulation of the driving-performance-related torque setpoint may be, for example, frequency and/or amplitude and/or phase-modulated. The modulation may also be performed by generating a driving sound according to the input value 3 by means of the electric motor and/or the drive train. It is possible, for example, to generate a dynamic torque setpoint $M_{dyn}$, which corresponds to that of an 8-cylinder motor, i.e. for example the progression of a superimposition of eight four-stroke cylinder torque patterns, which may be offset from each other by a phase angle $\Delta\Phi$. The modulation may change depending on the input value 3. A maximum amplitude may, for example, be scaled depending on the input value 4 to be able to regulate the volume.

FIG. 2 illustrates a diagram with a dynamic torque setpoint applied against the phase angle $\Phi$ of the rotor, in accordance with some embodiments. FIG. 2 shows a possible progression of the dynamic torque setpoint $M_{dyn}$, applied against a phase angle $\Phi$ of the rotor, which may correspond to the phase angle $\Phi$ of a crankshaft. The progression of the dynamic torque setpoint $M_{dyn}$ may imitate the torque pattern of a four-stroke cylinder and comprise a plurality of angle ranges. A period may comprise angle ranges in which the dynamic torque setpoint $M_{dyn}$ lies below the driving-performance-related torque setpoint $M_p$. It is possible that it has a negative torque, i.e. that the rotor is braked in this range. It is possible that a period comprises an angle range with a dynamic torque that is greater than the driving-performance-related torque setpoint $M_p$. The driving-performance-related torque setpoint $M_p$ may be the average torque of a period. The dynamic torque $M_{dyn}$ may imitate a torque pattern of a four-stroke cylinder, i.e., divided into four segments, which corresponds to the intake phase, the compression phase, the power phase and the exhaust phase of a four-stroke cylinder.

Overall, the examples show how the present disclosure makes it possible to generate driving sounds without a sound generation device.

The invention claimed is:

1. A method for operating an electric motor, the method comprising:
   transmitting, from a vehicle dynamics controller to an acoustic controller, a driving-performance-related torque setpoint, wherein the acoustic controller is configured as a control device;
   receiving, at the acoustic controller, an input value for defining an acoustic signal;
   receiving, at the acoustic controller from power electronics, a phase angle of a rotor of the electric motor;
   modulating, by the acoustic controller, at least one torque pattern that depends on the phase angle of the rotor of the electric motor onto the driving-performance-related torque setpoint to generate a dynamic torque setpoint; and
   transmitting, from the acoustic controller to the power electronics, the dynamic torque setpoint,
   wherein the dynamic torque setpoint is such that a sound according to the input value is generated by the electric motor and/or a drive train.

2. The method of claim 1, further comprising generating the dynamic torque setpoint, wherein the dynamic torque setpoint comprises a value that is smaller than a first value of the driving-performance-related torque setpoint and larger than a second value of the driving-performance-related torque setpoint,
   wherein the first value is within at least one angle range of a specified period of the phase angle, and
   wherein the second value is within a wider angle range of the specified period of the phase angle.

3. The method of claim 2, wherein the specified period of the phase angle is multiplied with a factor (k), wherein the factor (k) depends on the input value.

4. The method of claim 1, further comprising averaging of the dynamic torque setpoint across a specified period of the phase angle to generate the driving-performance-related torque setpoint.

5. The method of claim 1, further comprising generating the dynamic torque setpoint that comprises at least two superimposed torque patterns, wherein the at least two superimposed torque patterns are offset from each other by a phase offset of the phase angle.

6. The method of claim 1, further comprising determining the specified period of the phase angle that excites the drive train in a resonance frequency.

7. The method of claim 1, wherein the receiving the input value comprises receiving an operating parameter of the motor vehicle or an audio file.

8. An acoustic controller, comprising:
   a processor device configured to perform operations comprising:
   receiving, from a vehicle dynamics controller, a driving-performance-related torque setpoint;
   receiving an input value for defining an acoustic signal;
   receiving, from power electronics, a phase angle of a rotor of an electric motor;
   modulating at least one torque pattern that depends on the phase angle of the rotor of the electric motor onto the driving-performance-related torque setpoint to generate a dynamic torque setpoint; and
   transmitting, to the power electronics, the dynamic torque setpoint,
   wherein the dynamic torque setpoint is such that a sound according to the input value is generated by the electric motor and/or a drive train.

9. A motor vehicle, comprising:
   an acoustic controller comprising a processor device, wherein the processor device is configured to perform operations comprising:
   receiving, from a vehicle dynamics controller, a driving-performance-related torque setpoint;
   receiving an input value for defining an acoustic signal;
   receiving, from power electronics, a phase angle of a rotor of an electric motor;
   modulating at least one torque pattern that depends on the phase angle of the rotor of the electric motor onto the driving-performance-related torque setpoint to generate a dynamic torque setpoint; and
   transmitting, to the power electronics, the dynamic torque setpoint,
   wherein the dynamic torque setpoint is such that a sound according to the input value is generated by the electric motor and/or a drive train.

10. The motor vehicle of claim 9, wherein the input value for defining the acoustic signal comprises an operating parameter of the motor vehicle or an audio file.

* * * * *